(12) United States Patent
Casci et al.

(10) Patent No.: US 11,219,885 B2
(45) Date of Patent: Jan. 11, 2022

(54) JMZ-1, A CHA-CONTAINING ZEOLITE AND METHODS OF PREPARATION

(71) Applicant: JOHNSON MATTHEY PUBLIC LIMITED COMPANY, London (GB)

(72) Inventors: John Casci, Billingham (GB); Jillian Collier, Reading (GB); Paul Cox, London (GB); Robert Peter Hodgkins, London (GB); Geraint Lloyd, Billingham (GB); Alessandro Turrina, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/699,054

(22) Filed: Nov. 28, 2019

(65) Prior Publication Data

US 2020/0171472 A1 Jun. 4, 2020

Related U.S. Application Data

(60) Provisional application No. 62/773,248, filed on Nov. 30, 2018.

(51) Int. Cl.
*B01J 29/72* (2006.01)
*C01B 39/04* (2006.01)
(Continued)

(52) U.S. Cl.
CPC ........ *B01J 29/723* (2013.01); *B01D 53/9418* (2013.01); *B01J 35/04* (2013.01); *B01J 37/0018* (2013.01); *B01J 37/0203* (2013.01); *B01J 37/0236* (2013.01); *B01J 37/10* (2013.01); *C01B 39/48* (2013.01); *F01N 3/2066* (2013.01);
(Continued)

(58) Field of Classification Search
None
See application file for complete search history.

(56) References Cited

U.S. PATENT DOCUMENTS

| | | | |
|---|---|---|---|
| 4,544,538 A | 10/1985 | Zones | |
| 9,636,667 B2 * | 5/2017 | Feyen | ..... C01B 39/04 |

(Continued)

FOREIGN PATENT DOCUMENTS

| | | |
|---|---|---|
| EP | 3473598 A1 | 4/2019 |
| EP | 3830032 A1 | 6/2021 |

(Continued)

OTHER PUBLICATIONS

Liang et al., "CHA-type Zeolites With High Boron Content: Synthesis, Structure and Selective Adsorption Properties," Micro. Meso. Mat. 2014 (194) pp. 97-105.

*Primary Examiner* — Sheng H Davis

(57) ABSTRACT

JMZ-1, a zeolite having a CHA structure and containing trimethyl(cyclohexylmethyl)ammonium cations as a structure directing agent is described. A calcined zeolite, JMZ-1C, that does not contain a structure directing agent, is also described. Metal containing JMZ-1C has improved SCR activity compared to CHA-containing zeolites having the same metal loading and comparable silica:alumina ratios (SAR). Methods of preparing JMZ-1, JMZ-1C and metal containing calcined counterparts of JMZ-1C are described along with methods of using JMZ-1C and metal containing calcined counterparts of JMZ-1C in treating exhaust gases.

3 Claims, 6 Drawing Sheets

(51) Int. Cl.
*B01D 53/94* (2006.01)
*B01J 35/04* (2006.01)
*B01J 37/00* (2006.01)
*B01J 37/02* (2006.01)
*B01J 37/10* (2006.01)
*C01B 39/48* (2006.01)
*F01N 3/20* (2006.01)

(52) U.S. Cl.
CPC ............... *B01D 2255/2061* (2013.01); *B01D 2255/20761* (2013.01); *B01D 2255/50* (2013.01); *B01J 2229/186* (2013.01); *B01J 2229/34* (2013.01); *C01P 2002/72* (2013.01); *C01P 2004/03* (2013.01); *F01N 2610/02* (2013.01)

(56) References Cited

U.S. PATENT DOCUMENTS

| | | |
|---|---|---|
| 2007/0100185 A1 | 5/2007 | Cao et al. |
| 2008/0045767 A1 | 2/2008 | Cao et al. |
| 2014/0112852 A1* | 4/2014 | Mohanan ............ B01D 53/8628 423/213.2 |
| 2014/0147378 A1* | 5/2014 | Davis ....................... C01B 39/48 423/703 |
| 2015/0078992 A1 | 3/2015 | Elomari |

FOREIGN PATENT DOCUMENTS

| | | |
|---|---|---|
| WO | 2011064186 A1 | 6/2011 |
| WO | 2017100384 A1 | 6/2017 |
| WO | 2017204212 A1 | 11/2017 |

* cited by examiner

JMZ-1, A CHA-CONTAINING ZEOLITE AND METHODS OF PREPARATION

FIELD OF INVENTION

The present invention relates to a JMZ-1, a CHA-containing zeolite containing a structure directing agent (SDA) within the framework structure, and a calcined zeolite (JMZ-1C). The invention also relates to methods of preparation of JMZ-1 and JMZ-1C and methods using the calcined zeolite, JMZ-1C, as a catalyst.

BACKGROUND OF THE INVENTION

Zeolites are crystalline materials constructed of repeating $TO_4$ tetrahedral units with T being most commonly Si, Al or P (or combinations of tetrahedral units). These units are linked together to form frameworks having regular intracrystalline cavities and/or channels of molecular dimensions. Aluminosilicates have Si and Al as T. Numerous types of synthetic zeolites have been synthesized and each has a unique framework based on the specific arrangement of its tetrahedral units. By the IUPAC nomenclature, each topological type is assigned a unique three-letter code (e.g., "CHA") by the International Zeolite Association (IZA) (http://www.iza-structure.org/databases/).

Zeolites have numerous industrial applications, and zeolites of certain frameworks, such as CHA, are known to be effective catalysts for treating combustion exhaust gas in industrial applications including internal combustion engines, gas turbines, coal-fired power plants, and the like. In one example, nitrogen oxides ($NO_x$) in the exhaust gas may be controlled through a so-called selective catalytic reduction (SCR) process whereby $NO_x$ compounds in the exhaust gas are contacted with a reducing agent in the presence of a zeolite catalyst.

Synthetic zeolites of the CHA topological type, when prepared as aluminosilicate compositions, are produced using structure directing agents (SDAs), also referred to as a "templates" or "templating agents". The SDAs that are used in the preparation of aluminosilicate CHA topological type materials are typically complex organic molecules which guide or direct the molecular shape and pattern of the zeolite's framework. Generally, the SDA can be considered as a mold around which the zeolite crystals form. After the crystals are formed, the SDA is removed from the interior structure of the crystals, leaving a molecularly porous aluminosilicate cage.

In typical synthesis techniques, solid zeolite crystals precipitate from a reaction mixture which contains the framework reactants (e.g., a source of silicon and a source of aluminum), a source of hydroxide ions (e.g., NaOH), and an SDA. Such synthesis techniques usually take several days (depending on factors such as crystallization temperature) to achieve the desired crystallization. When crystallization is complete, the solid precipitate containing the zeolite crystals is separated from the mother liquor which is discarded. This discarded mother liquor contains unused SDA, which is often degraded due to harsh reaction conditions, and unreacted silica.

U.S. Pat. No. 4,544,538 relates to a crystalline zeolite, SSZ-13, is prepared from organic nitrogen-containing cations derived from 1-adamantamine, 3-quinuclidinol, and 2-exo-aminonorbornane. SSZ-13 has the crystal structure of chabazite. The characteristic lines of XRD of uncalcined SSZ-13 zeolites, with the organic templating component present, is provided in Table 1 of U.S. Pat. No. 4,544,538 and is shown in Table 1 below.

TABLE 1

| 2θ | d(A) | 100 I/Io |
|---|---|---|
| 9.57 | 9.24 | 61 |
| 14.06 | 6.30 | 21 |
| 16.23 | 5.46 | 80 |
| 17.82 | 4.98 | 24 |
| 20.87 | 4.26 | 100 |
| 22.14 | 4.01 | 9 |
| 22.72 | 3.91 | 8 |
| 25.01 | 3.56 | 69 |
| 26.30 | 3.589 | 18 |
| 31.00 | 2.885 | 47 |
| 31.29 | 2.859 | 21 |

The characteristic lines of XRD of calcined SSZ-13 zeolites, where the organic templating component has been removed, is provided in Table 2 of U.S. Pat. No. 4,544,538 and is shown in Table 2 below.

TABLE 2

| 2θ | d(A) | 100 I/Io |
|---|---|---|
| 9.62 | 9.19 | 100 |
| 13.04 | 6.79 | 32 |
| 16.22 | 5.46 | 18 |
| 17.99 | 4.93 | 16 |
| 20.87 | 4.26 | 50 |
| 23.36 | 3.808 | 6 |
| 25.23 | 3.530 | 18 |
| 26.26 | 3.394 | 11 |
| 31.02 | 2.883 | 27 |
| 31.44 | 2.846 | 13 |

U.S. Pat. No. 9,636,667 relates to a process for the preparation of a zeolitic material having a CHA-type framework structure comprising $YO_2$ and $X_2O_3$, wherein said process comprises the steps of: (1) providing a mixture comprising one or more sources for $YO_2$, one or more sources for $X_2O_3$, and one or more tetraalkylammonium cation $R^1R^2R^3R^4N^+$-containing compounds as structure directing agent; (2) crystallizing the mixture obtained in step (1) for obtaining a zeolitic material having a CHA-type framework structure; wherein Y is a tetravalent element and X is a trivalent element, wherein $R^1$, $R^2$, and $R^3$ independently from one another stand for alkyl, wherein $R^4$ stands for cycloalkyl, and wherein the mixture provided in step (1) does not contain any substantial amount of a source for $Z_2O_5$, wherein Z is P, as well as to zeolitic materials which may be obtained according to the inventive process and to their use. The characteristic lines of XRD of the zeolitic material having a CHA-type framework structure comprises at least the following reflections shown in Table 3 of U.S. Pat. No. 9,636,667.

TABLE 3

| Diffraction angle 2θ/° [Cu K(alpha 1)] | Intensity (%) |
|---|---|
| 9.44-9.88 | 29-92 |
| 16.03-16.55 | 32-79 |
| 17.81-18.13 | 12-42 |
| 20.62-21.30 | 100 |
| 25.02-25.42 | 25-70 |
| 30.83-31.43 | 39-73 |

There is a need to develop new zeolites having the basic structure of known zeolites, where minor changes in the structure can affect one or more of the catalytic properties of the zeolite. In some cases, while minor changes in the structure may not be discernable using normally used analytical techniques, the catalytic activity of the structurally modified zeolite may be improved relative to very closely related analogous zeolites. Unexpected improvements in the catalytic activity of such structurally modified zeolites can allow for the compositions of exhaust gases from engines to meet various regulatory requirements.

SUMMARY OF THE INVENTION

In a first aspect of the invention, provided is a zeolite, JMZ-1, having a CHA type framework, where the zeolite has a composition having the molar relationship: $SiO_2:(n)Y_2O_3$, where Y=Al, Fe, B or Ga and n=0 to 0.1, wherein (a) the X-ray powder diffraction pattern before calcination removal of the templating agent contains at least the following diffraction peaks (in degrees 2θ (±0.2) having the relative intensities shown in parenthesis) at: 9.55 (VS), 16.27 (VS), 20.99 (VS), 24.65 (M) and 31.22 (M)±0.2, and (b) the X-ray diffraction data after calcination removal of the templating agent contains at least the following peaks (in degrees 2θ having the relative intensities shown in parenthesis) at: 9.59 (VS), 13.03 (M), 16.21 (W), 17.99 (W), 20.83 (M-S), 23.31 (W), 25.24 (W), 26.22 (W), 30.98 (M-W) and 31.43 (W)±0.2, where the relative intensity is based on the strongest line in the X-ray pattern which is assigned a value of 100 and (W) [weak] is less than 20; (M) [medium] is between 20 and 40; (S) [strong] is between 40 and 60; and (VS) [very strong) is greater than 60].

Also provided is a composition comprising a zeolite, JMZ-1, having a CHA type framework and a structure directing agent (SDA) wherein the SDA is within the framework structure, said zeolite having a composition having the molar relationship: $SiO_2:(n)Y_2O_3$, where Y=Al, Fe, B or Ga and n=0 to 0.1, and having a characteristic X-ray powder diffraction pattern comprising 2-theta positions at 9.55 (VS), 16.27 (VS), 20.99 (VS), 24.65 (M) and 31.22 (M)±0.2 with the corresponding relative intensity shown in parenthesis.

In a second aspect of the invention, provided is a calcined zeolite (JMZ-1C) comprising a framework structure comprising a CHA type framework, having a composition having the molar relationship: $SiO_2:(n)Y_2O_3$, where Y=Al, Fe, B or Ga and n=0 to 0.1, and having a characteristic X-ray powder diffraction pattern comprising 2-theta positions at 9.59 (VS), 13.03 (M), 16.21 (W), 17.99 (W), 20.83 (M-S), 23.31 (W), 25.24 (W), 26.22 (W), 30.98 (M-W) and 31.43 (W)±0.2 with the corresponding relative intensity shown in parenthesis.

In a third second aspect of the invention, provided is a composition comprising a mixture of water, a silica source, an alumina source, a base, an alkali metal cation, and trimethyl(cyclohexylmethyl) ammonium cations, wherein the composition has a molar compositional ratio of:

| | |
|---|---|
| $SiO_2/Al_2O_3$ | 10-100 |
| $OH^-/SiO_2$ | 0.05-1 |
| $R/SiO_2$ | 0.05-0.5 |
| Alkali metal cation / $SiO_2$ | 0.1-1.0 |
| $H_2O/SiO_2$ | 5-80 | wherein R is the SDA, preferably trimethyl(cyclohexylmethyl) ammonium cations. This composition can be used to manufacturing a zeolite of the first or second aspects of the invention.

In a fourth second aspect of the invention, provided is a composition comprising a calcined zeolite of the second aspect of the invention and one or more of a filler, a binder, a stabilizer and a rheology modifier.

In a fifth second aspect of the invention, provided is a catalyst article comprising: (a) a composition of the fourth aspect of the invention; and (b) a monolith substrate onto or within which said composition is incorporated.

In a sixth aspect of the invention, provided is a system comprising an engine that produces NOx, a catalytic article comprising JMZ-1C or a metal containing JMZ-1C, a conduit for directing a flowing exhaust gas from the engine to the catalytic article, and a source of nitrogenous reductant disposed upstream of the catalytic article.

In a seventh aspect of the invention, provided is a method for forming JMZ-1 by:

a. forming a reaction mixture comprising: (i) at least one source of alumina, (ii) at least one source of silica, and (iii) a structure directing agent (SDA) comprising trimethyl(cyclohexylmethyl) ammonium cation, b. heating the reaction mixture and forming zeolite crystals having a CHA framework and the structure directing agent, and a mother liquor, and c. recovering at least a portion of the zeolite crystals from the mother liquor.

In an eight aspect of the invention, provided is a method for forming the calcined zeolite (JMZ-1C) of the second aspect of the invention by calcining JMZ-1.

In a ninth aspect of the invention, provided is a method for treating an exhaust gas from an engine by contacting the exhaust gas with JMZ-1C or a metal impregnated JMZ-1C.

In a tenth aspect of the invention, JMZ-1C or a metal containing JMZ-1C, can promote the formation of methylamines from the reaction of methanol and ammonia and the conversion of methanol to lower olefins, especially ethylene and propylene.

In an eleventh aspect of the invention, a catalyst article for converting a low molecular weight oxygen containing species to an olefin rich hydrocarbon stream can comprise JMZ-1C or a metal containing JMZ-1C, where JMZ-1C or a metal containing JMZ-1C is disposed on a support and/or within a structure

DETAILED DESCRIPTION OF THE INVENTION

Figure 1:
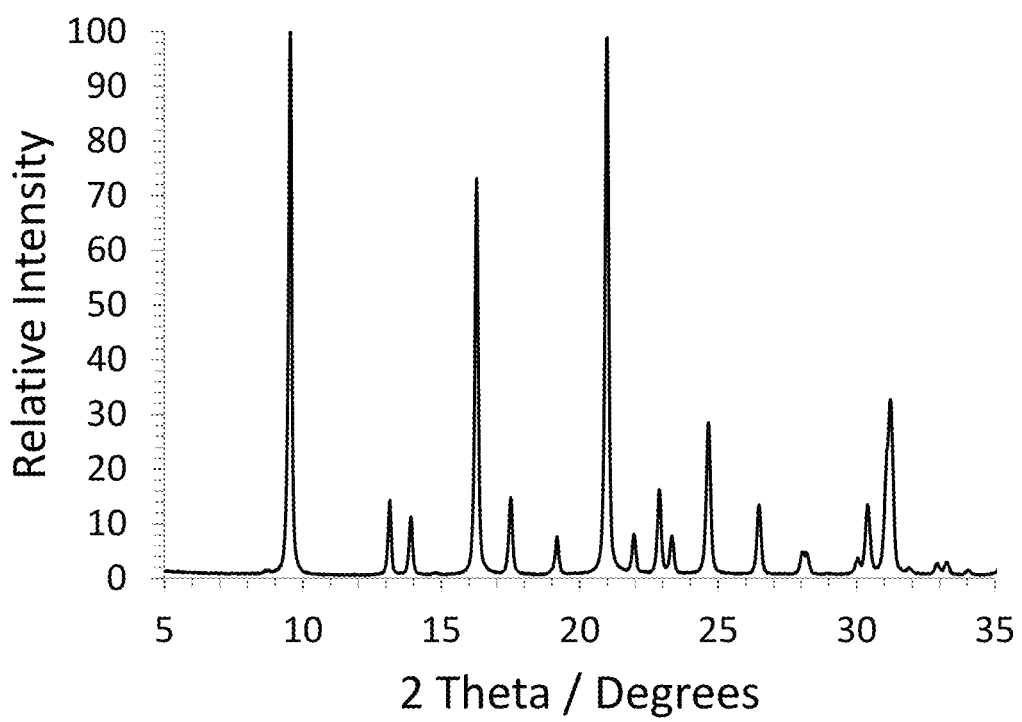
FIG. 1 is an XRD pattern of a sample of JMZ-1 as prepared in Example 1.

As used in this specification and the appended claims, the singular forms "a", "an" and "the" include plural referents unless the context clearly indicates otherwise. Thus, for example, reference to "a catalyst" includes a mixture of two or more catalysts, and the like.

When a range, or ranges, for various numerical elements are provided, the range, or ranges, can include the values, unless otherwise specified.

The term "zeolite", as used herein, is a molecular sieve comprising at least one tetravalent T-atom or mixture of tetravalent T-atoms (e.g., silicon, germanium or mixtures thereof) and at least one trivalent T-atom or mixtures of trivalent T-atoms (e.g., aluminum, boron, gallium, vanadium, iron or mixtures thereof). Preferably the zeolites as used herein are aluminosilicates which have a framework constructed of alumina and silica (i.e., repeating $SiO_4$ and $AlO_4$ tetrahedral units). A zeolite can contain cationic inorganic materials, including metals, and cationic or neutral organic species (including structure directing agents) within cages, pores, and/or channels formed by the framework structure. Calcined zeolites are considered to be void of structure directing agents.

As used herein, the term "CHA" refers to an CHA topological type as recognized by the International Zeolite Association (IZA) Structure Commission and the term "CHA zeolite" means an aluminosilicate in which the primary crystalline phase is CHA. Other crystalline phases may also be present, but the primary crystalline phase comprises at least about 90 weight percent CHA, preferably at least about 95 weight percent CHA, and even more preferably at least about 97 or at least about 99 weight percent CHA. Preferably, the CHA molecular sieve is substantially free of other crystalline phases and is not an intergrowth of two or more framework types. By "substantially free" with respect to other crystalline phases, it is meant that the molecular sieve contains at least 99 weight percent CHA, where the weight % is based on the weight of the framework and does not include exchanged metals.

The term "within the framework structure" means that the material is located within one or more of the cages, pores, and/or channels formed by the framework structure, but is not located within the framework that forms the structure of the zeolite.

The term "within cages, pores, and/or channels formed by the framework structure" means that the material (SDA) is located within one or more of the cages, pores, and/or channels formed by the framework structure, but is not present in the framework structure of the zeolite.

The term "extra-framework metal containing zeolite" refers to a zeolite in which the metal is on the surface of and/or within the cages and/or pores of the zeolite. It does not refer to zeolites in which the metal is in the framework that forms the zeolite.

The term "free" or "free of" means that the material referenced as being "free of", an impurity, may only be present in trace amount, generally less than 1% by weight, preferably less than 0.5% by weight, more preferably <0.1% by weight.

The term "essentially free" means that the referenced material does not have an appreciable amount of the referenced material. That is, the referenced material is not present in amount that would affect the basic physical and/or chemical properties of the material, particularly with respect to the material's capacity to selectively reduce or store NOx. In certain embodiments, the referenced material is present at a level of less than 3 weight percent, preferably less than 1 weight percent, and more preferably less than 0.5 weight percent, and even more preferably less than 0.1 weight percent.

In certain embodiments, a source of alkali metal, such as sodium, is not intentionally added to the synthesis mixture to provide this material to the mixture. The phrase "essentially alkali-free" or "alkali-free" as it is used herein means that alkali metal is not added to the synthesis mixture as an intentional ingredient. An "essentially alkali-free" or "alkali-free" catalyst as referred to herein means generally that the catalyst material contains an inconsequential level of alkali metal with regard to the intended catalytic activity. In certain embodiments, the JMZ-1 or JMZ-1C zeolite contains less than about 0.1 weight percent, and preferably less than about 0.01 weight percent, alkali metal such as sodium or potassium.

In a first aspect of the invention, provided is a zeolite (JMZ-1) having a CHA type framework, the zeolite having a composition having the molar relationship: $SiO_2:(n)Y_2O_3$, where Y=Al, Fe, B or Ga and n=0 to 0.1, wherein (a) the X-ray powder diffraction pattern before calcination removal of the templating agent contains at least the following diffraction peaks (in degrees 2θ (±0.2) having the relative intensities shown in parenthesis) at: 9.55 (VS), 16.27 (VS), 20.99 (VS), 24.65 (M) and 31.22 (M)±0.2, and (b) the X-ray diffraction data after calcination removal of the templating agent contains at least the following peaks (in degrees 2θ having the relative intensities shown in parenthesis) at: 9.59 (VS), 13.03 (M), 16.21 (W), 17.99 (W), 20.83 (M-S), 23.31 (W), 25.24 (W), 26.22 (W), 30.98 (M-W) and 31.43 (W)±0.2, where the relative intensity is based on the strongest line in the X-ray pattern which is assigned a value of 100 and (W) [weak] is less than 20; (M) [medium] is between 20 and 40; (S) [strong] is between 40 and 60; and (VS) [very strong] is greater than 60].

The characteristic X-ray powder diffraction pattern of the zeolite of the first aspect of the invention can further comprise 2-theta positions at 13.15 (W), 13.91 (W), 17.50 (W), 19.18 (W), 21.95 (W), 22.87 (W), 23.34 (W), 26.49 (W), 28.05 (W), and 30.43 (W)±0.2 with the corresponding relative intensity shown in parenthesis.

The powder XRD pattern of JMZ-1 is shown in FIG. 1. The characteristic lines are shown in Table 4 with the primary characteristic lines indicated by *.

TABLE 4

Powder XRD characteristic lines for as-made
(template containing) JMZ-1 zeolite.

| Degrees two-theta[a] | I/Io | Relative I/Io |
|---|---|---|
| 9.55 | 100 | VS |
| 13.15 | 14 | W |
| 13.91 | 11 | W |
| 16.27 | 73 | VS |
| 17.50 | 15 | W |
| 19.18 | 8 | W |
| 20.99 | 99 | VS |
| 21.95 | 8 | W |
| 22.87 | 16 | W |
| 23.34 | 8 | W |
| 24.65 | 29 | M |
| 26.49 | 13 | W |
| 28.05 | 5 | W |
| 30.40 | 14 | W |
| 31.22 | 33 | M |

[a] = ±0.2

The relative intensity is based on the strongest line in the X-ray pattern which is assigned a value of 100. W (weak) is less than 20; M (medium) is between 20 and 40; S (strong) is between 40 and 60; and VS (very strong) is greater than 60.

The characteristic X-ray powder diffraction pattern of the zeolite of the first aspect of the invention can further comprise 2-theta positions at 13.15 (W), 13.91 (W), 17.50 (W), 19.18 (W), 21.95 (W), 22.87 (W), 23.34 (W), 28.05 (W) and 30.40 (W)±0.2 with the corresponding relative intensity shown in parenthesis.

The X-ray powder diffraction patterns were determined by standard techniques. The radiation was the K-alpha/doublet of copper and a scintillation counter spectrometer with a strip-chart pen recorder was used. The peak heights, I, and their positions, in degrees, 2θ, where θ is the Bragg angle, were read from the spectrometer chart. From these measured values, the relative intensities, 100 I/$I_o$, where $I_o$ is the intensity of the strongest line or peak, and d, the interplanar spacing in Angstroms corresponding to the recorded lines, can be calculated. The X-ray diffraction pattern of Table 4 is characteristic of all species of JMZ-1 (template containing) family compositions. Minor variations in the diffraction pattern values in the tables or the figures can also result from variations in the organic compound used in the preparation and from variations in the silica-to-alumina mole ratio from sample to sample. Notwithstanding these minor perturbations, the basic crystal structures for the as-prepared condition and the calcined condition remain substantially unchanged.

The characteristic lines (degrees two-theta and relative intensity) of the zeolite described in U.S. Pat. No. 9,636,667 are shown in Table 5 along with corresponding peaks of as-made (SDA) containing JMZ-1 zeolite.

TABLE 5

| JMZ-1 | | US 9,636,667 | |
|---|---|---|---|
| Degrees two-theta | I/Io % | Degrees two-theta | I/Io % |
| 9.55 | 100 | 9.44-9.88 | 29-92 |
| 16.27 | 73 | 16.03-16.55 | 32-79 |
|  | <2 | 17.81-18.13 | 12-42 |
| 20.99 | 100 | 20.62-21.30 | 100 |
|  | <2 | 25.02-25.42 | 25-70 |
| 31.22 | 33 | 30.83-31.43 | 39-73 |

JMZ-1 is novel over the zeolites described in U.S. Pat. No. 9,636,667, which require the zeolites to have an XRD pattern having the six peaks within the ranges listed above and having intensities relative to that of a peak between 20.62 and 21.30 degrees two-theta where that peak is the highest peak and is assigned a relative intensity of 100. JMZ-1 differs from the zeolites described in U.S. Pat. No. 9,636,667 because:

JMZ-1 does not have a peak (intensity <2% of maximum intensity) at 17.81-18.1 and at 25.02-25.42;

JMZ-1 has a peak in the range of 9.44-9.88 degrees two-theta but the relative intensity of peak in JMZ-1 is 100, which is greater than the range of 29-92 required for the zeolites of U.S. Pat. No. 9,636,667; and JMZ-1 has a peak in the range of 30.83-31.43 degrees two-theta but the relative intensity of peak in JMZ-1 is 33, which is less than the range of 39-73 required for the zeolites of U.S. Pat. No. 9,636,667.

Therefore, the XRD spectra of JMZ-1 is distinct from the XRD of the zeolites in U.S. Pat. No. 9,636,667.

The zeolite can be an aluminosilicate (Y=Al).

When the zeolite is an aluminosilicate, it can have a silica-to-alumina ratio (SAR) of about 10 to about 50, preferably 15 to 30, more preferably 20-25.

The structure-directing agent can comprise trimethyl(cyclohexylmethyl) ammonium cations.

The zeolite JMZ-1 is crystalline and have a CHA framework, the framework comprising a tetravalent silicon oxide, a trivalent aluminum oxide, and having a trimethyl(cyclohexylmethyl) ammonium cation present in the crystal structure, wherein the zeolite crystals are anhydrous and free of substituted or unsubstituted 5,4-azonium anions and are free of ammonium anions having a substituents selected from bridged polycyclics, cycloaryls, heterocyclics, cycloalkyls other than cyclohexylmethyl, and C2-C4 alkyls. A composition can comprise a zeolite having these elements.

The zeolite framework can be free or essentially free of: (i) transition metals, including antimony, bismuth, chromium, cobalt, copper, iron, manganese, molybdenum, nickel, niobium, tin, titanium, tungsten, vanadium, zinc, and zirconium; (ii) noble metals including platinum group metals (PGMs), such as indium, palladium, platinum, rhodium and ruthenium, and precious metals, such as gold and silver; and (iii) rare earth metals such as cerium, erbium, europium, lanthanum, neodymium, praseodymium, terbium, ytterbium, and yttrium.

The zeolites of the present invention are not silicoaluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce $NO_x$ over a broad temperature range. The amount of framework phosphorous can be less than about 1 weight percent, preferably less than 0.1 weight percent, most preferably less than 0.01 weight percent, based on the total weight of the zeolite.

The zeolite of the CHA topological type of the present invention may contain low levels of iron. The iron may in a framework tetrahedral site and/or as a cationic species. The amount of iron in a framework tetrahedral site and/or as a cationic species following synthesis is usually less than about 0.1 weight percent.

Also provided is a composition comprising a zeolite, JMZ-1, having a CHA type framework and a structure directing agent (SDA) wherein the SDA is within the framework structure, said zeolite having a composition having the molar relationship: $SiO_2:(n)Y_2O_3$, where Y=Al, Fe, B or Ga and n=0 to 0.1, and having a characteristic X-ray powder diffraction pattern comprising 2-theta positions at 9.55 (VS), 16.27 (VS), 20.99 (VS), 24.65 (M) and 31.22 (M)±0.2 with the corresponding relative intensity shown in parenthesis.

In a second aspect of the invention, provided is a zeolite (JMZ-1C) comprising a framework structure comprising a CHA type framework, and having a composition having the molar relationship: $SiO_2:(n)Y_2O_3$, where Y=Al, Fe, B or Ga and n=0 to 0.1, and having a characteristic X-ray powder diffraction pattern comprising 2-theta positions at 9.59 (VS), 13.03 (M), 16.21 (W), 17.99 (W), 20.83 (M-S), 23.31 (W), 25.24 (W), 26.22 (W), 30.98 (M-W) and 31.43 (W)±0.2 with the corresponding relative intensity shown in parenthesis, and wherein the zeolite does not comprise a structure directing agent (SDA). The zeolite is preferably a calcined zeolite.

JMZ-1C is novel over the zeolites described in U.S. Pat. No. 9,636,667, which require the zeolites to have an XRD pattern having the six peaks within the ranges listed above and having intensities relative to that of a peak between 20.62 and 21.30 degrees two-theta where that peak is the highest peak and is assigned a relative intensity of 100. The characteristic lines (degrees two-theta and relative intensity) of the zeolite described in U.S. Pat. No. 9,636,667 are shown in Table 6 along with corresponding peaks of JMZ-1C.

TABLE 6

| JMZ-1C | | US 9,636,667 | |
| --- | --- | --- | --- |
| Degrees two-theta | I/Io % | Degrees two-theta | I/Io % |
| 9.59 | 100 | 9.44-9.88 | 29-92 |
| 16.21 | 16 | 16.03-16.55 | 32-79 |
| 17.99 | 12 | 17.81-18.13 | 12-42 |
| 20.83 | 41 | 20.62-21.30 | 100 |
| 25.24 | 12 | 25.02-25.42 | 25-70 |
| 30.98 | 19 | 30.83-31.43 | 39-73 |

JMZ-1C differs from the zeolites described in U.S. Pat. No. 9,636,667 because of the following:

- The peak with the maximum intensity of JMZ-1C is at 9.59 degrees two-theta, while the peak with the maximum intensity of a zeolite of U.S. Pat. No. 9,636,667 is at 20.62-21.30 degrees two-theta.
- JMZ-1C has a peak in the range of 9.44-9.88 degrees two-theta but the relative intensity of peak in JMZ-1 is 100, which is greater than the range of 29-92 required for the zeolites of U.S. Pat. No. 9,636,667.
- JMZ-1C has a peak in the range of 16.03-16.55 degrees two-theta but the relative intensity of peak in JMZ-1 is 16, which is less than the range of 32-79 required for the zeolites of U.S. Pat. No. 9,636,667.
- JMZ-1C has a peak in the range of 20.62-21.30 degrees two-theta but the relative intensity of peak in JMZ-1 is 41, which is less than 100 as required for the zeolites of U.S. Pat. No. 9,636,667.
- JMZ-1C has a peak in the range of 25.02-25.42 degrees two-theta but the relative intensity of peak in JMZ-1 is 12, which is less than the range of 25-70 required for the zeolites of U.S. Pat. No. 9,636,667.
- JMZ-1C has a peak in the range of 30.83-31.43 degrees two-theta but the relative intensity of peak in JMZ-1 is 19, which is less than the range of 39-73 required for the zeolites of U.S. Pat. No. 9,636,667.

Therefore, the XRD spectra of JMZ-1C is distinct from the XRD of the zeolites in U.S. Pat. No. 9,636,667.

Zeolite JMZ-1c can be an aluminosilicate. (Y=Al.)

JMZ-1C preferably can comprise one or more catalytic metal ions exchanged or otherwise impregnated into the cavities, channels and/or pores of the zeolite. Examples of metals that can be post-zeolite synthesis exchanged or impregnated include: (i) transition metals, including antimony, bismuth, chromium, cobalt, copper, iron, manganese, molybdenum, nickel, niobium, tin, titanium, tungsten, vanadium, zinc and zirconium; (ii) noble metals including platinum group metals (PGMs), such as indium, palladium, platinum, rhodium and ruthenium, and precious metals such as gold and silver; (iii) alkaline earth metals such as barium, beryllium, calcium, magnesium and strontium, and (iv) rare earth metals such as cerium, erbium, europium, lanthanum, neodymium, praseodymium, terbium, ytterbium, and yttrium. Preferred transition metals for post-synthesis exchange are selected from the group consisting of cobalt, copper, iron, manganese, nickel, and mixtures thereof.

Particularly preferred exchanged metals include copper and iron, particularly when combined with calcium and/or cerium and particularly when the transition metals ($T_M$) and the alkaline metals ($A_M$) are present in a $T_M:A_M$ molar ratio of about 15:1 to about 1:1, for example about 10:1 to about 2:1, about 10:1 to about 3:1, or about 6:1 to about 4:1.

The transition metal can be present in an amount of about 0.1 to about 10 weight percent, for example about 0.5 to about 5 weigh percent, about 0.1 to about 1.0 weight percent, about 2.5 to about 3.5 weight percent, and about 4.5 to about 5.5 weight percent, wherein the weight percent is relative to the total weight of the zeolite material.

The zeolite, JMZ-1C, can be useful as a catalyst in certain applications. Dried JMZ-1 crystals are preferably calcined, but they can also be used without calcination. The zeolite, JMZ-1C, preferably calcined, can be used either without a post-synthesis metal exchange or with a post-synthesis metal exchange, preferably with a post-synthesis metal exchange.

In certain aspects of the invention, provided is a catalyst comprising JMZ-1C that is free or essentially free of any exchanged metal, particularly post-synthesis exchanged or impregnated metals.

Metals incorporated post-synthesis can be added to the molecular sieve via any known technique such as ion exchange, impregnation, isomorphous substitution, etc.

These exchanged metal cations are distinct from metals constituting the molecular framework of the zeolite, and thus metal exchanged zeolites are distinct from metal-substituted zeolites.

The catalytic properties of the calcined zeolite (JMZ-1C) comprising an exchanged metal, such as copper, are distinct from those of other zeolites having a CHA structure and having a comparable SAR after hydrothermal aging. A comparable SAR is an SAR that is within two units, preferably within three units, more preferably within four units. As shown below in the Example 3, the catalytic activity of a calcined zeolite (JMZ-1C) comprising an exchanged metal, such as copper, and hydrothermally aged at 900 C for 3 hours can provide one or more of:

a. at least 10% greater NOx conversion at a temperature in the range from about 175° C. to about 225° C. compared to the CHA catalyst having a comparable SAR (SAR=22-25); and b. at least 20% greater $NH_3$ conversion at a temperature in the range from about 165° C. to about 225° C. compared to the CHA catalyst having a comparable SAR (SAR=22-25).

After hydrothermal aging at 900° C. for three hours, JMZ-1C containing 3% Cu by impregnation can provide increased NOx reduction, especially at temperatures less than 225° C. compared to 3% Cu containing chabazites having a comparable SAR (SAR=22 to 25). After hydrothermal aging at 900° C. for three hours, JMZ-1C containing 3% Cu by impregnation can provide increased $NH_3$ conversion, especially at temperatures between 165° C. and 225° C. compared to 3% Cu containing CHA zeolite having a comparable SAR.

In a third second aspect of the invention, provided is a composition comprising a mixture of water, a silica source, an alumina source, a base, an alkali metal cation, and trimethyl(cyclohexylmethyl) ammonium cations, wherein the composition has a molar compositional ratio of:

| | |
|---|---|
| $SiO_2/Al_2O_3$ | 10-100 |
| $OH^-/SiO_2$ | 0.05-1 |
| $R/SiO_2$ | 0.05-0.5 |
| Alkali metal cation/$SiO_2$ | 0.1-1.0 |
| $H_2O/SiO_2$ | 5-80 | wherein R is the SDA, preferably trimethyl(cyclohexylmethyl) ammonium cations.

Preferably, the composition has a molar compositional ratio of:

| | |
|---|---|
| $SiO_2/Al_2O_3$ | 15-70 |
| $OH^-/SiO_2$ | 0.1-0.7 |
| $R/SiO_2$ | 0.05-0.2 |
| Alkali metal cation/$SiO_2$ | 0.15-0.65 |
| $H_2O/SiO_2$ | 10-6 |

The composition can be a solution, a colloidal dispersion (colloidal sol), gel, or paste, with a gel being preferred.

In a fourth aspect of the invention, provided is a composition comprising a calcined zeolite of the second aspect of the invention and one or more of a filler, a binder, a stabilizer and a rheology modifier.

The calcined zeolite can comprise an extra-framework transition metal or noble metal. The extra-framework transition metal can be selected from the group consisting of Co, Cu, Fe, Mn, Mo, Nb, Ni, Ta, V, and W. Preferably the extra-framework transition metal is Cu or Fe.

The extra-framework noble metal can be selected from Ag, Au, Ir, Os, Pd, Pt, Rh or Ru.

The calcined zeolite can comprise about 0.1 to about 5 weight percent of a transition metal or noble metal.

The calcined zeolite can comprise about 0.1 to about 5 weight percent ionic copper.

The calcined zeolite can further comprise Ca, Ce or a combination of Ca and Ce.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. A washcoat containing the catalyst can be applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, a catalyst article can comprise an CHA catalyst described herein coated on and/or incorporated into a substrate.

Certain aspects of the invention provide a catalytic washcoat. The washcoat comprising a calcined zeolite, JMZ-1C, described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. The catalyst composition can comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. Preferably, the washcoat loading is >0.3 g/in$^3$, such as >1.2 g/in$^3$, >1.5 g/in$^3$, >1.7 g/in$^3$ or >2.00 g/in$^3$, and preferably <3.5 g/in$^3$, such as <2.5 g/in$^3$. The washcoat can be applied to a substrate in a loading of about 0.8 to 1.0 g/in$^3$, 1.0 to 1.5 g/in$^3$, or 1.5 to 2.5 g/in$^3$.

In a fifth second aspect of the invention, provided is a catalyst article comprising: (a) a composition of the fourth aspect of the invention; and (b) a monolith substrate onto or within which said composition is incorporated.

Two of the most common substrate designs to which catalyst may be applied are honeycomb and plate. Preferred substrates, particularly for mobile applications, include flow-through monoliths and wall-flow monoliths. Flow-through monoliths have a so-called honeycomb geometry that comprise multiple adjacent, parallel channels that are open on both ends and generally extend from the inlet face to the outlet face of the substrate and result in a high-surface area-to-volume ratio. Wall flow monoliths are similar to flow-through monoliths except that the channel ends of wall-flow monoliths are alternatively plugged to force the gas flow through porous walls that act as filters.

For certain applications, the honeycomb flow-through monolith preferably has a high cell density, for example about 600 to about 800 cells per square inch, and/or an average internal wall thickness of about 0.18 to about 0.35 mm, preferably about 0.20 to about 0.25 mm. For certain other applications, the honeycomb flow-through monolith preferably has a low cell density of about 150 to about 600 cells per square inch, more preferably about 200 to about 400 cells per square inch. Preferably, the honeycomb monoliths are porous.

In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3$/Ni or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. The plate substrate can be constructed of metal, preferably corrugated metal.

A catalyst article can be made by a process described herein. The catalyst article can be produced by a process that includes the steps of applying a metal containing calcined zeolite (JMZ-1C), preferably as a washcoat, to a substrate as a layer either before or after at least one additional layer of another composition, such as an ammonia oxidation catalyst, an oxidation catalyst, reduction catalyst, scavenging component, or $NO_x$ storage component, for treating exhaust gas has been applied to the substrate. The one or more catalyst layers on the substrate, including the CHA catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

The CHA catalyst can be disposed on the substrate as a first layer or zone and another composition, such as an oxidation catalyst, reduction catalyst, scavenging component, or $NO_x$ storage component, can be disposed on the substrate as a second layer or zone. As used herein, the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. The second layer can be applied to an inert substrate as a bottom layer and the first layer is a top layer that is applied over the second layer as a consecutive series of sub-layers.

The exhaust gas can penetrate (and hence contact) the first layer, before contacting the second layer, and subsequently returns through the first layer to exit the catalyst component.

The first layer can be a first zone disposed on an upstream portion of the substrate and the second layer is disposed on the substrate as a second zone, wherein the second zone is downstream of the first.

The catalyst article can be produced by a process that includes the steps of applying JMZ-1C, preferably as a washcoat, to a substrate as a first zone, and subsequently applying at least one additional composition for treating an exhaust gas to the substrate as a second zone, wherein at least a portion of the first zone is downstream of the second zone. Alternatively, the CHA catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components can be designed to perform more than one function. For example, applying an SCR catalyst to a wall-flow filter substrate to form an SCRF instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. This is a preferred application of the calcined zeolite because of the stability of the calcined zeolite after hydrothermal aging. The substrate can be a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. The efficiency can be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

In general, the production of an extruded solid body, such as honeycomb flow-through or wall-flow filter, containing the catalyst JMZ-1C involves blending JMZ-1C, a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. JMZ-1C, the catalytically active calcined zeolite, may also be washcoated or otherwise applied to the extruded solid body as one or more sub-layers that reside on the surface or penetrate wholly or partly into the extruded solid body.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Preferably, JMZ-1C, the calcined zeolite, is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

In the sixth aspect of the invention provided is a system comprising an engine that produces NOx, a catalytic article comprising JMZ-1C or a metal containing JMZ-1C, a conduit for directing a flowing exhaust gas from the engine to the catalytic article, and a source of nitrogenous reductant disposed upstream of the catalytic article. The system can treat exhaust gas generated by combustion process, such as from an internal combustion engine (whether mobile or stationary), a gas turbine, coal or oil fired power plants, and the like. Such systems include a catalytic article comprising JMZ-1C, a zeolite of the second aspect of the invention, and at least one additional component for treating the exhaust gas, wherein the catalytic article and at least one additional component are designed to function as a coherent unit.

A system can comprise an engine that produces NOx, a catalytic article comprising JMZ-1C or a metal containing JMZ-1C, a conduit for directing a flowing exhaust gas from the engine to the catalytic article, and a source of nitrogenous reductant disposed upstream of the catalytic article. The system can include a controller for metering the nitrogenous reductant into the flowing exhaust gas only when it is determined that JMZ-1C or a metal containing JMZ-1C is capable of catalyzing $NO_x$ reduction at or above a desired efficiency over a specific temperature range, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$.

The system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. The at least one platinum group metal can be platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

A catalyst article can have an ammonia slip catalyst disposed downstream of a selective catalytic reduction (SCR) catalyst. The ammonia slip catalyst can oxidize at least a portion of any nitrogenous reductant that is not consumed by the selective catalytic reduction process. The ammonia slip catalyst can be disposed on the outlet side of a wall flow filter and an SCR catalyst can be disposed on the upstream side of a filter. The ammonia slip catalyst can be disposed on the downstream end of a flow-through substrate and an SCR catalyst can be disposed on the upstream end of the flow-through substrate. The ammonia slip catalyst and SCR catalyst can be disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In a seventh aspect of the invention, provided is a method for forming JMZ-1 by:

a. forming a reaction mixture comprising: (i) at least one source of alumina, (ii) at least one source of silica, and (iii) a structure directing agent (SDA) comprising trimethyl(cyclohexylmethyl) ammonium cation, b. heating the reaction mixture and forming zeolite crystals having a CHA framework and the structure directing agent and a mother liquor, and c. recovering at least a portion of the zeolite crystals from the mother liquor.

The zeolite crystals are preferably separated from the subsequent mother liquor by any conventional technique, such as filtration.

The reaction mixture for the JMZ-1 synthesis process typically contains at least one source of silica, at least one source of alumina, at least one SDA useful in forming JMZ-1, and at least one source of hydroxide ions. It is understood, however, that the synthesis method described herein is not necessarily limited to aluminosilicates, but can also be applied to synthesize other molecular sieves having an CHA structure such as borosilicates ferrosilicates, titanosilicates, vanadosilicates, and that is, when aluminum is effectively replaced by B, Fe, Ti or V, respectively. Thus, more generally, the reaction mixture from which molecular sieves are crystallized comprises at least one active source of a tetravalent oxide or mixture of tetravalent oxides (e.g., silicon oxide, germanium oxide or mixtures thereof) and at least one trivalent oxide or mixtures of trivalent oxides (e.g., aluminum oxide, boron oxide, gallium oxide, iron oxide, vanadium oxide, or mixtures thereof). The reaction mixture can also employ an aluminosilicate zeolite of the FAU topological type as the source of aluminum.

Suitable silica sources include, without limitation, fumed silica, silicates, precipitated silica, colloidal silica, silica gels, zeolites such as zeolite Y and/or zeolite X, and silicon hydroxides and alkoxides. Silica sources resulting in a high relative yield are preferred. Typical alumina sources also are generally known and include aluminates, alumina, other zeolites such as zeolite FAU, aluminum colloids, boehmites, pseudo-boehmites, aluminum hydroxides, aluminum salts such as aluminum sulfate and alumina chloride, aluminum hydroxides and alkoxides, alumina gels.

Typically, a source of hydroxide ions such as an alkali metal hydroxide and/or an alkaline earth metal hydroxide, including hydroxide of sodium, potassium, lithium, cesium, rubidium, calcium, and magnesium, is used in the reaction mixture. However, this component can be omitted so long as the equivalent basicity is maintained. The SDA can be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture can further comprise an alkali metal. The alkali metal is preferably sodium, potassium or a combination thereof.

Salts, particularly alkali metal halides such as sodium chloride, can be added to or formed in the reaction mixture as well.

Preferably, the reaction mixture is free or essentially free of one or more of fluorine, fluorine-containing compounds, and fluorine ions (fluoride).

An SDA, preferably a trimethyl(cyclohexylmethyl) ammonium cation, can be associated with an anion selected from the group consisting of fluoride, chloride, bromide, iodide, hydroxide, acetate, sulfate, tetrafluoroborate, carboxylate, carbonate and bicarbonate. Preferably the SDA is with an iodide anion or a hydroxide anion, more preferably a hydroxide anion.

The reaction mixture can further comprise from about 0.1 to about 10% w/w of seed crystals, wherein the seed crystals comprise a crystalline molecular sieve having a CHA framework.

The seed crystals can comprise from 1 to 40 weight percent of at least one crystalline molecular sieve impurity.

The reaction mixture comprises a mixture of water, a silica source, an alumina source, a base, an alkali metal cation, and trimethyl(cyclohexylmethyl) ammonium cations, wherein the composition has a molar compositional ratio of:

| | |
|---|---|
| $SiO_2/Al_2O_3$ | 10-100 |
| $OH^-/SiO_2$ | 0.05-1 |
| $R/SiO_2$ | 0.05-0.5 |
| Alkali metal cation/$SiO_2$ | 0.1-1.0 |
| $H_2O/SiO_2$ | 5-80 | wherein R is the SDA, preferably trimethyl(cyclohexylmethyl) ammonium cations.

Preferably, the reaction mixture has a molar compositional ratio of:

| | |
|---|---|
| $SiO_2/Al_2O_3$ | 15-70 |
| $OH^-/SiO_2$ | 0.1-0.7 |
| $R/SiO_2$ | 0.05-0.2 |
| Alkali metal cation/$SiO_2$ | 0.15-0.65 |
| $H_2O/SiO_2$ | 10-6 |

The reaction mixture can be a solution, a colloidal dispersion (colloidal sol), gel, or paste, with a gel being preferred.

Preferably, the overall process will have an overall yield on silica of at least about 60%, for example at least about 70%, at least about 80%. Preferably, the overall process will have an overall yield on SDA of at least about 40%, for example at least about 60%, at least about 80%, at least about 90%, about 40 to about 90%, about 40 to about 60%, about 60 to about 80%, about 80 to about 90%, about 90 to about 95%, or about 95 to about 99%.

Reaction temperatures, mixing times and speeds, and other process parameters that are suitable for conventional CHA synthesis techniques are also generally suitable for the present invention. Generally, the reaction mixture is maintained at an elevated temperature until the JMZ-1 crystals are formed. The hydrothermal crystallization is usually conducted under autogenous pressure, at a temperature between about 75 to about 220° C., for example between about 120 and 160° C., for duration of several hours, for example, about 0.1 to about 20 days, and preferably from about 0.25 to about 3 days. Preferably, the zeolite is prepared using stirring or agitation.

During the hydrothermal crystallization step, crystals of JMZ-1 can be allowed to nucleate spontaneously from the reaction mixture. The use of JMZ-1 crystals or other crystals with CHA topology as seed material can be advantageous in decreasing the time necessary for complete crystallization to occur. When used as seeds, JMZ-1 crystals can be added in an amount between 0.1 and 10% of the weight of silica used in the reaction mixture.

Once the JMZ-1 crystals have formed, the solid product is separated from the reaction mixture by standard separation techniques such as filtration. The JMZ-1 crystals are water-washed and then dried, for several second to a few minutes (e.g., 5 second to 10 minutes for flash drying) or several hours (e.g., about 4 to about 24 hours for oven drying at 75 to about 150° C.), to obtain as-synthesized JMZ-1 crystals having a CHA topological type framework and an SDA within the crystals. The drying step can be performed at atmospheric pressure or under vacuum.

It will be appreciated that the foregoing sequence of steps, as well as each of the above-mentioned periods of time and temperature values are merely exemplary and may be varied.

The JMZ-1 zeolite crystals produced in accordance with this process can be uniform, with little to no twinning and/or multiple twinning or may form agglomerates.

The JMZ-1 crystals produced in accordance with the methods described herein can have a mean crystalline size of about 0.01 to about 5 µm, for example about 0.5 to about 5 µm, about 0.1 to about 1 µm, and about 1 to about 5 µm. Large crystals can be milled using a jet mill or other particle-on-particle milling technique to an average size of about 1.0 to about 1.5 micron to facilitate washcoating a slurry containing the catalyst to a substrate, such as a flow-through monolith.

JMZ-1 synthesized by the methods described herein preferably have a silica-to-alumina ratio (SAR) of between about 8 and about 50, inclusive, about 10 to about 35, or about 15 to about 25. The SAR can be selectively achieved based on the composition of the starting synthesis mixture and/or adjusting other process variables. The silica-to-alumina ratio of zeolites may be determined by conventional analysis. This ratio is meant to represent, as closely as possible, the ratio in the rigid atomic framework of the zeolite crystal and to exclude silicon or aluminum in the binder (for catalyst applications) or, in cationic or other form, within the channels.

Zeolites synthesized by the present method may include one or more extra-framework alkali and/or alkaline earth metals. These metals are typically introduced into the reaction mixture in conjunction with the source of hydroxide ions. Examples of such metals include one or more of barium, calcium, cesium, lithium, magnesium, potassium, rubidium, sodium and strontium.

Usually it is desirable to remove the alkali metal cation by ion exchange and replace it with hydrogen, ammonium, or any desired metal ion. Accordingly, zeolites of the present invention may be a Na-form zeolite, a K-form zeolite, or a combined N, K-form and the like, or may be an H-form zeolite, an ammonium-form zeolite, or a metal-exchanged zeolite. Typical ion exchange techniques involve contacting the synthetic zeolite with a solution containing a salt of the desired replacing cation or cations. Although a wide variety of salts can be employed, chlorides and other halides, nitrates, sulfates and carbonates are particularly preferred. Representative ion exchange techniques are widely known in the art. Ion exchange occurs post-synthesis and can take place either before or after the zeolite is calcined. Following contact with the salt solution of the desired replacing cation, the zeolite is typically washed with water and dried at temperatures ranging from 65° C. to about 315° C., usually between 80° C. and 150° C. After washing, the zeolite can be calcined in an inert gas and/or air at temperatures ranging from about 315° C. to 850° C. for periods of time ranging from 1 to 48 hours, or more, to produce a catalytically active and stable zeolite.

In an eight aspect of the invention, provided is a method for forming JMZ-1C by calcining JMZ-1. As used herein, the term "calcine", "calcining" or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the zeolite and also to adhere the zeolite to a substrate. The temperatures used in calcination depend upon the components in the material to be calcined and generally are between about 300° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

In the ninth aspect of the invention, provided are methods for treating an exhaust gas from an engine by contacting the exhaust gas with a catalyzed zeolite of the second aspect of the invention (JMZ-1C or a metal impregnated JMZ-1C).

A method for the reduction of $NO_x$ compounds and/or oxidation of $NH_3$ in a gas comprises contacting the gas with JMZ-1C or a metal containing JMZ-1C for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

JMZ-1C or a metal containing JMZ-1C can promote the reaction of a reductant, preferably ammonia, with nitrogen oxides to selectively form elemental nitrogen ($N_2$) and water ($H_2O$). Thus, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

All, or at least a portion of, the nitrogen-based reductant, particularly $NH_3$, for consumption in the SCR process can be supplied by a $NO_X$ adsorber catalyst (NAC), a lean $NO_X$ trap (LNT), or a $NO_X$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

During periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. The method can be used for treating exhaust gas from a vehicular lean burn internal combustion engine, such as a diesel engine, a lean-burn gasoline engine or an engine powered by liquid petroleum gas or natural gas.

A method for treating an exhaust gas can comprise contacting a combustion exhaust gas containing $NO_x$ and/or $NH_3$ with a catalyst article of the fifth aspect of the invention to selectively reduce at least a portion of the $NO_x$ into $N_2$ and $H_2O$ and/or oxidize at least a portion of the $NH_3$.

The calcined zeolite of the second aspect of the invention (JMZ-1C, or a metal containing JMZ-1C) can also promote the oxidation of ammonia. Preferably, JMZ-1C contains one or more metal ions, such as copper or iron, that are impregnated into JMZ-1C. The catalyst can be formulated to favor the oxidation of ammonia with oxygen, particularly a concentration of ammonia typically encountered downstream of an SCR catalyst (e.g., ammonia oxidation (AMOX) catalyst, such as an ammonia slip catalyst (ASC)). The CHA catalyst can be disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the CHA catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas.

The SCR and/or AMOX process can be performed at a temperature of at least 100° C., preferably at a temperature from about 150° C. to about 750° C., more preferably from about 175 to about 550° C., even more preferably from 175 to 400° C.

In some conditions, the temperature range can be from 450 to 900° C., preferably 500 to 750° C., more preferably 500 to 650° C., even more preferably 450 to 550° C. Temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

In a tenth aspect of the invention, JMZ-1C or a metal containing JMZ-1C, can promote the formation of methylamines from the reaction of methanol and ammonia and the conversion of methanol to lower olefins, especially ethylene and propylene.

A method of converting an oxygenate, such as methanol, to an olefin (MTO) by contacting methanol with JMZ-1C or a metal containing JMZ-1C as herein before described. The reaction process for the conversion of an oxygenate to olefin (OTO) is well known in the art. Specifically, in an OTO reaction process, an oxygenate contacts a molecular sieve catalyst composition under conditions effective to convert at least a portion of the oxygenate to light olefins. When methanol is the oxygenate, the process is generally referred to as a methanol to olefin (MTO) reaction process. Methanol is a particularly preferred oxygenate for the synthesis of ethylene and/or propylene.

A process for converting an oxygenate feed to a light olefin product comprises: a) providing an oxygenate feed comprising a majority of methanol; b) providing a catalyst composition comprising JMZ-1C or a metal containing JMZ-1C and optionally a basic metal oxide co-catalyst; and c) contacting the oxygenate feed with the catalyst composition under conditions sufficient to convert at least a portion of the oxygenate feed to a light olefin product.

An oxygenate feedstock, particularly a mixed alcohol composition containing methanol and ethanol, is a useful feedstock for a variety of catalytic processes, particularly oxygenate to olefin (OTO) reaction processes, in which a catalyst composition, typically containing a primary oxide catalyst having at least two of Al, Si, and P (e.g., when the primate oxide catalyst has Al and Si, it is an aluminosilicate molecular sieve, preferably a high-silica aluminosilicate molecular sieve) and preferably a basic metal oxide co-catalyst, can be used to convert the oxygenate feedstock into a light olefin product, e.g., containing ethylene and/or propylene, preferably including ethylene. The olefins can then be recovered and used for further processing, e.g., in the manufacture of polyolefins such as polyethylene and/or polypropylene, olefin oligomers, olefin copolymers, mixtures thereof, and/or blends thereof.

One or more additional components can be included in the feedstock that is directed to the OTO reaction system. For example, a feedstock directed to the OTO reaction system can optionally contain, in addition to methanol and ethanol, one or more aliphatic-containing compounds such as alcohols, amines, carbonyl compounds for example aldehydes, ketones and carboxylic acids, ethers, halides, mercaptans, sulfides, and the like, and mixtures thereof. The aliphatic moiety of the aliphatic-containing compounds typically contains from 1 to 50 carbon atoms, preferably from 1 to 20 carbon atoms, more preferably from 1 to 10 carbon atoms, most preferably from 1 to 4 carbon atoms.

Non-limiting examples of aliphatic-containing compounds include: alcohols such as methanol, ethanol, n-propanol, isopropanol, and the like, alkyl-mercaptans such as methyl mercaptan and ethyl mercaptan, alkyl-sulfides such as methyl sulfide, alkyl amines such as methyl amine, alkyl ethers such as DME, diethyl ether and methyl ethyl ether, alkyl-halides such as methyl chloride and ethyl chloride, alkyl ketones such as dimethyl ketone, alkyl-aldehydes such as formaldehyde and acetaldehyde, and various organic acids such as formic acid and acetic acid.

The various feedstocks discussed above are converted primarily into one or more olefins. The olefins or olefin monomers produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene. Non-limiting examples of olefin monomer(s) include ethylene, propylene, butene-1, pentene-1,4-methyl-pentene-1, hexene-1, octene-1 and decene-1, preferably ethylene, propylene, butene-1, pentene-1,4-methyl-pentene-1, hexene-1, octene-1 and isomers thereof. Other olefin monomers can include, but are not limited to, unsaturated monomers, diolefins having 4 to 18 carbon atoms, conjugated or non-conjugated dienes, polyenes, vinyl monomers, and cyclic olefins.

In an eleventh aspect of the invention, a catalyst article for converting a low molecular weight oxygen containing species to an olefin rich hydrocarbon stream can comprise JMZ-1C or a metal containing JMZ-1C, where JMZ-1C or a metal containing JMZ-1C is disposed on a support and/or within a structure.

A catalyst article for converting a low molecular weight oxygen containing species to an aromatic rich hydrocarbon stream can comprise JMZ-1C or a metal containing JMZ-1C, where JMZ-1C or a metal containing JMZ-1C is disposed on a support and/or within a structure.

The catalyst can be incorporated or mixed with other additive materials. Such an admixture is typically referred to as formulated catalyst or as catalyst composition. Preferably, the additive materials are substantially inert to conversion reactions involving dialkyl ethers (e.g., dimethyl ether) and/or alkanols (e.g., methanol, ethanol, and the like).

One or more other materials can be mixed with JMZ-1C or a metal containing JMZ-1C, particularly a material that is resistant to the temperatures and other conditions employed in organic conversion processes. Such materials can include catalytically active and inactive materials and synthetic or naturally occurring zeolites, as well as inorganic materials such as clays, silica, and/or other metal oxides such as alumina. The latter may be either naturally occurring or in the form of gelatinous precipitates or gels including mixtures of silica and metal oxides. Use of a catalytically active material can tend to change the conversion and/or selectivity of the catalyst in the oxygenate conversion process. Inactive materials suitably can serve as diluents to control the amount of conversion in the process so that products can be obtained in an economic and orderly manner without employing other means for controlling the rate of reaction. These materials can be incorporated into naturally occurring clays, e.g., bentonite and kaolin, to improve the crush strength of the catalyst under commercial operating conditions. The materials (e.g., clays, oxides, etc.) can function as binders for the catalyst. It can be desirable to provide a catalyst having good crush strength, because, in commercial use, it can be desirable to prevent the catalyst from breaking down into powder-like materials.

Naturally occurring clays that can be employed can include, but are not limited to, the montmorillonite and kaolin family, which families include the subbentonites, and the kaolins commonly known as Dixie, McNamee, Ga. and Florida clays, or others in which the main mineral constituent includes halloysite, kaolinite, dickite, nacrite, or anauxite. Such clays can be used in the raw state as originally mined or initially subjected to calcination, acid treatment, or chemical modification. Other useful binders can include, but are not limited to, inorganic oxides such as silica, titania, beryllia, alumina, and mixtures thereof.

In addition to the foregoing materials, JMZ-1C or a metal containing JMZ-1C can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

The relative proportions of JMZ-1C or a metal containing JMZ-1C and an inorganic oxide matrix can vary widely. For example, a mixture can include a zeolite content ranging from about 1 to about 90 percent by weight and more usually, particularly when the composite is prepared in the form of beads, in the range from about 2 to about 80 weight percent of the composite.

The invention also relates to C2, C3, C4 and C5 products formed by OTO or MTO application using JMZ-1C or a metal containing JMZ-1C as a catalyst or co-catalyst.

EXAMPLES

The SDA (template) trimethyl(cyclohexylmethyl)ammonium cation (CAS Registry Number 30833-81-9) was prepared using well known procedures reported in literature (e.g. C. C. Price, E. L. Eliel and R. J. Convery, J. Org. Chem., 1957, 22, 347).

Example 1. Synthesis of Phase-Pure Zeolite JMZ-1

A reaction gel having a molar composition:

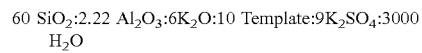

$60\ SiO_2 : 2.22\ Al_2O_3 : 6K_2O : 10\ Template : 9K_2SO_4 : 3000\ H_2O$ was prepared by weighing the individual reagents into a 45 ml PTFE cup containing a PTFE magnetic follower (stir bar). The reagents used, and their order of addition, was:

a) De-mineralised water, b) Colloidal Silica, c) Potassium Hydroxide, d) Aluminium Sulphate, e) Potassium Sulphate f) Template-Trimethyl(cyclohexylmethyl)ammonium iodide.

Seeds comprising a CHA framework (approximately 5% w/w based on the weight of solid silica used as a reagent) were added to the mixture. After all the reagents had been added, the mixture was thoroughly homogenised over a 15 minute period using an acoustic mixer. The PTFE cup was placed in a stainless steel outer vessel, sealed, then placed in an oven at 180° C. with rotation at 30 rpm and the reagents in the mixture were reacted. After 6 days at 180° C., the oven was cooled, the reactor was opened and the resulting material was subjected to centrifugation, decantation and addition of de-mineralised water. After the initial mixing with water and the removal of the water, the procedure was repeated 3 additional times (4 washes in total) following which resulting product was dried overnight at 110° C. The dried product was then analysed by powder XRD. The product comprised phase-pure zeolite JMZ-1. The powder XRD pattern is shown in FIG. 1 and the lines in the XRD pattern are shown in Table 7.

TABLE 7

Powder XRD characteristic lines for as-made (template containing) JMZ-1 zeolite.

| Degrees two-theta | I/Io | Relative I/Io |
|---|---|---|
| 9.55 | 100 | VS |
| 13.15 | 14 | W |
| 13.91 | 11 | W |
| 16.27 | 73 | VS |
| 17.50 | 15 | W |
| 19.18 | 8 | W |
| 20.99 | 99 | VS |
| 21.95 | 8 | W |
| 22.87 | 16 | W |
| 23.34 | 8 | W |
| 24.65 | 29 | M |
| 26.49 | 13 | W |
| 28.05 | 5 | W |
| 30.40 | 14 | W |
| 31.22 | 33 | M |

Table 8 shows a comparison of the characteristic lines of powder XRD of JMZ-1 with those of SSZ-13 (CHA containing SDA) taken from Table 1 in U.S. Pat. No. 4,544,538.

TABLE 8

Powder XRD characteristic lines for JMZ-1 (template containing) compared to Uncalcined SSZ-13 (template containing).

| JMZ-1 | | | SSZ-13 | | |
|---|---|---|---|---|---|
| Degrees two-theta | I/Io | Relative I/Io | Degrees two-theta | I/Io | Relative I/Io |
| 9.55 | 100 | VS | 9.57 | 61 | VS |
| 13.15 | 14 | W | | | |
| 13.91 | 11 | W | 14.06 | 21 | M |
| 16.27 | 73 | VS | 16.23 | 80 | VS |
| 17.50 | 15 | W | 17.82 | 24 | M |
| 19.18 | 8 | W | | | |
| 20.99 | 99 | W | 20.87 | 100 | VS |
| 21.95 | 8 | W | 22.14 | 9 | W |
| 22.87 | 16 | W | 22.72 | 8 | W |
| 23.34 | 8 | W | | | |
| 24.65 | 29 | M | 25.01 | 69 | VS |
| 26.49 | 14 | W | 26.30 | 18 | W |
| 28.05 | 5 | W | | | |
| 30.40 | 14 | W | | | |
| | | | 31.00 | 47 | |
| 31.22 | 33 | M | 31.29 | 21 | S |

This comparison shows that although both JMZ-1 and SSZ-13 are template containing zeolites having a CHA structure, the structure of the two materials is different.

Example 2. Synthesis of Zeolite JMZ-1 for Catalytic Evaluation

A reaction gel having a molar composition:

60 SiO$_2$:2.22 Al$_2$O$_3$:6K$_2$O:10 Template:9K$_2$SO$_4$:3000 H$_2$O was prepared by weighing the individual reagents into a 45 ml PTFE coated cup containing a PTFE magnetic follower (stir bar). The reagents used, and their order of addition, was:
a) De-mineralised water,
b) Colloidal Silica,
c) Potassium Hydroxide,
d) Aluminium Sulphate,
e) Potassium Sulphate
f) Template-Trimethyl(cyclohexylmethyl)ammonium iodide.

The reaction mixture was homogenised as described in Example 1 then reacted for 6 days at 180° C. while rotating the reactor at 30 rpm.

Figure 2:
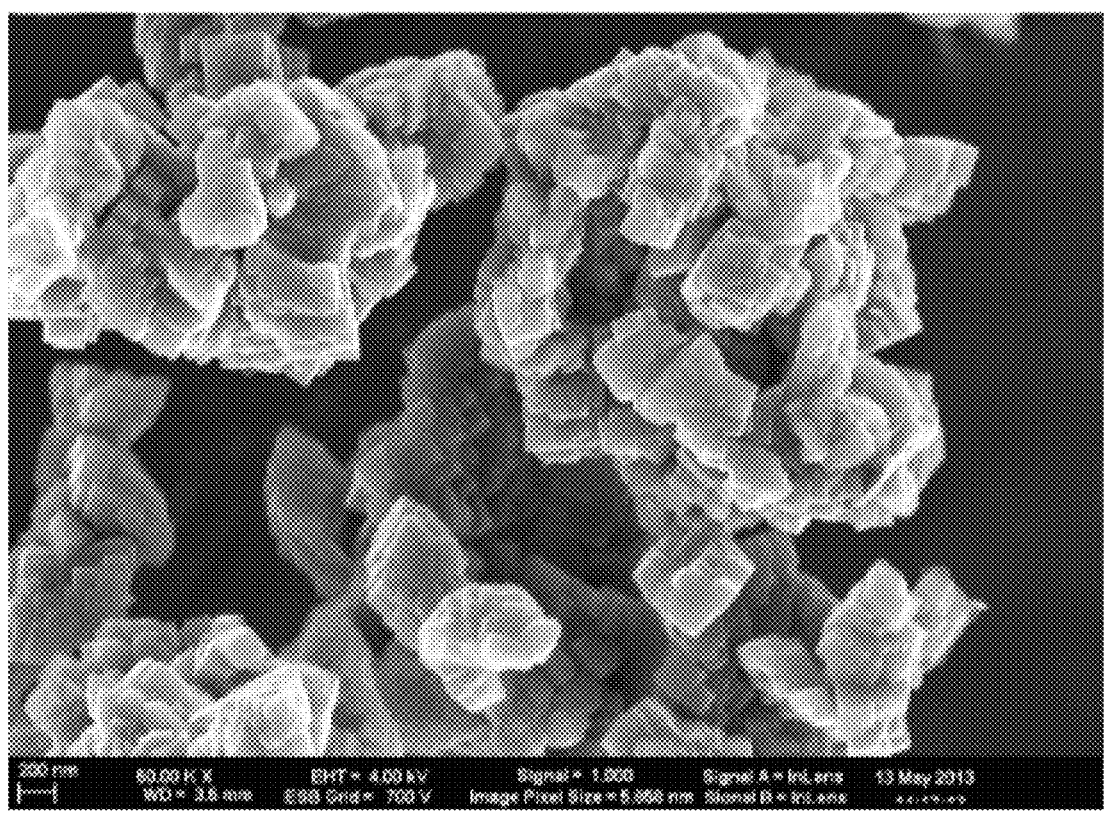
FIG. 2 is an SEM micrograph of a sample of JMZ-1 as prepared in Example 2.

The product was treated as described in Example 1, then analysed by powder XRD. The product comprised phase-pure zeolite JMZ-1 with a powder XRD diffraction pattern very similar to that in Example 1. Analysis by XRF showed the product to have a silica-to-alumina ratio (SAR) of 23.4. An SEM image of the product is shown is FIG. 2.

The as-made zeolite (JMZ-1) was activated by calcining in air. The sample was heated to 110° C. at 2° C./min then heated to 450° C. at 5° C./min and held at 450° C. for 16 hours. The material was then heated to 550° C. at 5° C./min at held at 550° C. for 16 hours. The sample, JMZ-1C, was cooled to room temperature, and then it was ion-exchanged with a 1 molar solution of ammonium chloride using 10 ml of solution per gram of calcined zeolite. The ion-exchange was carried out with stirring at room temperature for 1 hour. The stirring was then stopped, the ion-exchanged zeolite was centrifuged and the clear supernatant was decanted off. This ion-exchange procedure was repeated, then the zeolite was centrifuged, washed (supernatant decanted off) and then dried. The resulting NH$_4$-form zeolite was converted to the H-form by calcining, in air, by heating to 150° C. at 2° C./min and holding at 150° C. for 10 hours followed by heating to 450° C. at 5° C./min with a final hold at 450° C. for 16 hours.

Figure 3:
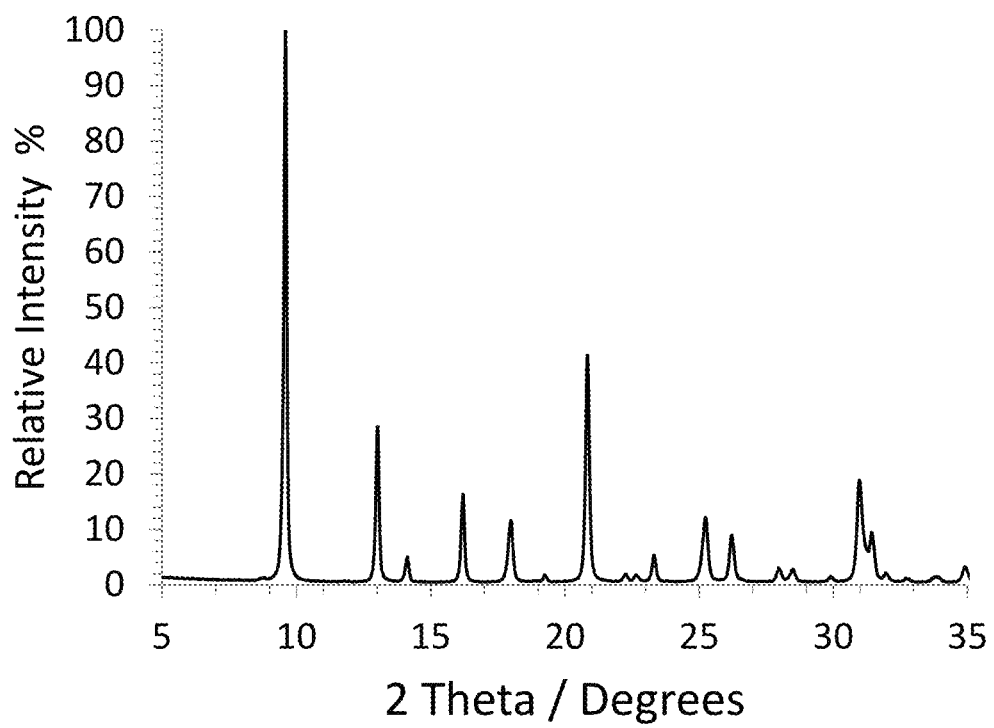
FIG. 3 is an XRD pattern of a sample of calcined JMZ-1 (JMZ-1C) as prepared in Example 2.

The product after activation had an XRD powder pattern as shown in FIG. 3 and contained the interplanar spacings and intensities shown in Table 9 below:

TABLE 9

Characteristic XRD peaks of activated product

| Degrees two-theta | I/Io | Relative Intensity |
|---|---|---|
| 9.59 | 100 | VS |
| 13.03 | 29 | M |
| 16.21 | 16 | W |
| 17.99 | 12 | W |
| 20.83 | 41 | M-S |
| 23.31 | 5 | W |
| 25.24 | 12 | W |
| 26.22 | 9 | VS |
| 30.98 | 19 | M |
| 31.43 | 9 | M |

Example 3. Catalyst Testing for NH$_3$ SCR

Calcined JMZ-1 product described in Example 2, JMZ-1C, was impregnated with copper at a loading of 3 wt % using the required amount of copper (II) acetate monohydrate (Alfa Aesar) dissolved in de-mineralised water. The impregnated sample was dried overnight at 105° C. and then calcined in air at 500° C. for 2 hours.

Samples of the powdered catalyst were pelletized and then aged in a flow of 4.5% H$_2$O in air. The samples were heated at a rate of 10° C./min to 900° C. After being held at a temperature of 900° C. for either 1 or 3 hours, the samples were cooled in the steam/air mixture until then temperature was <200° C., then air only flowed over the samples until they cooled to about room temperature.

Pelletized samples of the powder catalyst were tested in an apparatus in which a gas comprising 500 ppm NOx (NO-only), 550 ppm NH$_3$, 10%O2, 10% H$_2$O, with the remainder being N$_2$ flowed over the catalyst at a space velocity of 60K (390 L/gcat/h). The temperature was increased (ramped) from 150 to 500° C. at 5° C./minute.

Figure 4:
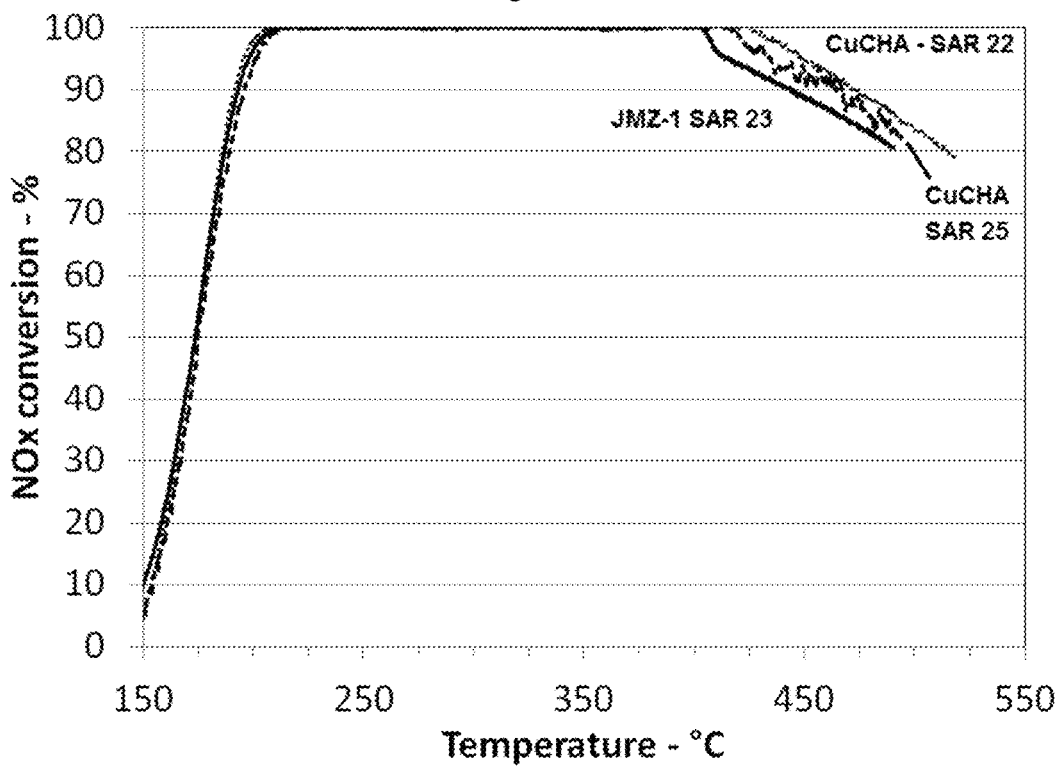
FIG. 4 is a graph of the % NOx conversion using fresh 3% Cu-containing CHA zeolites.
Figure 5:
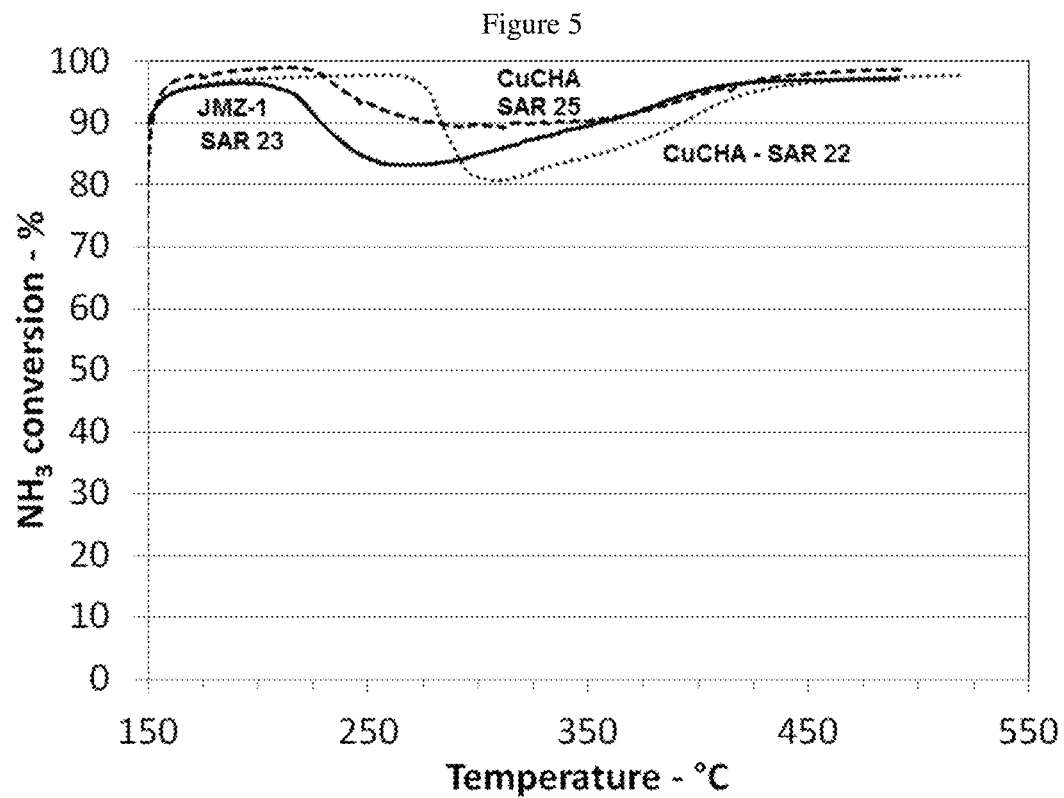
FIG. 5 is a graph of the $N_2O$ concentration in exhaust gas passing over fresh 3% Cu-containing CHA zeolites.
Figure 6:
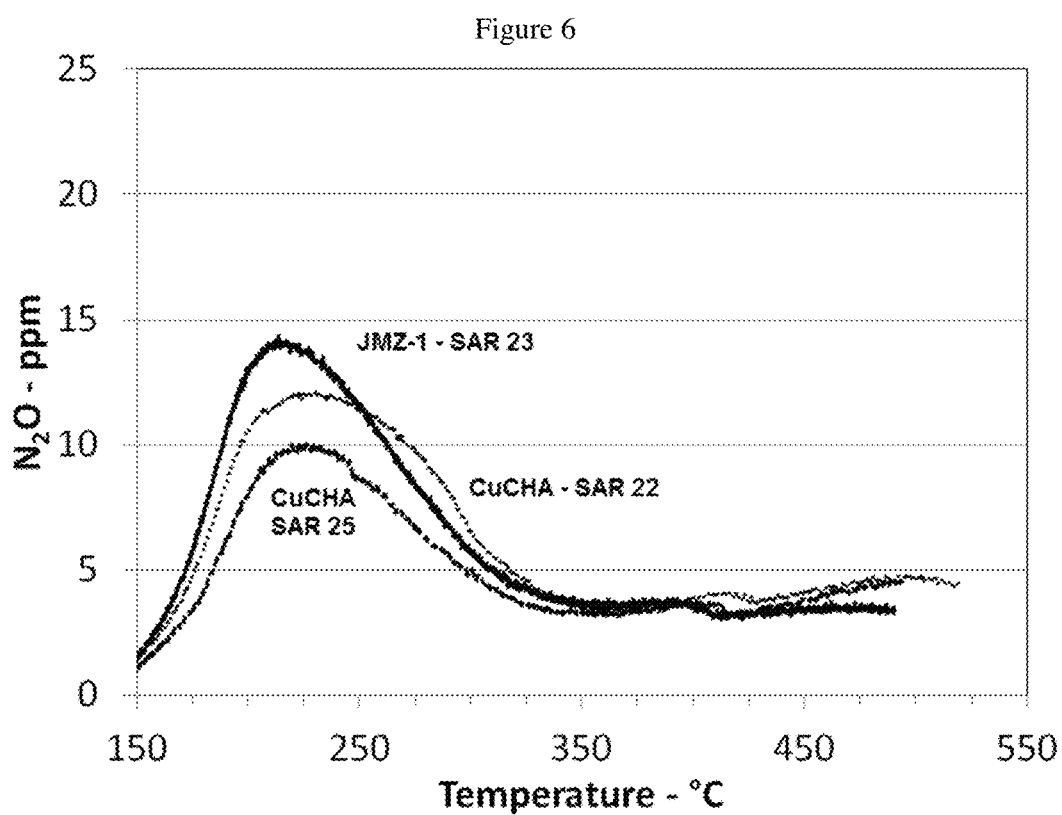
FIG. 6 is a graph of the % $NH_3$ conversion using fresh 3% Cu-containing CHA zeolites.
Figure 7:
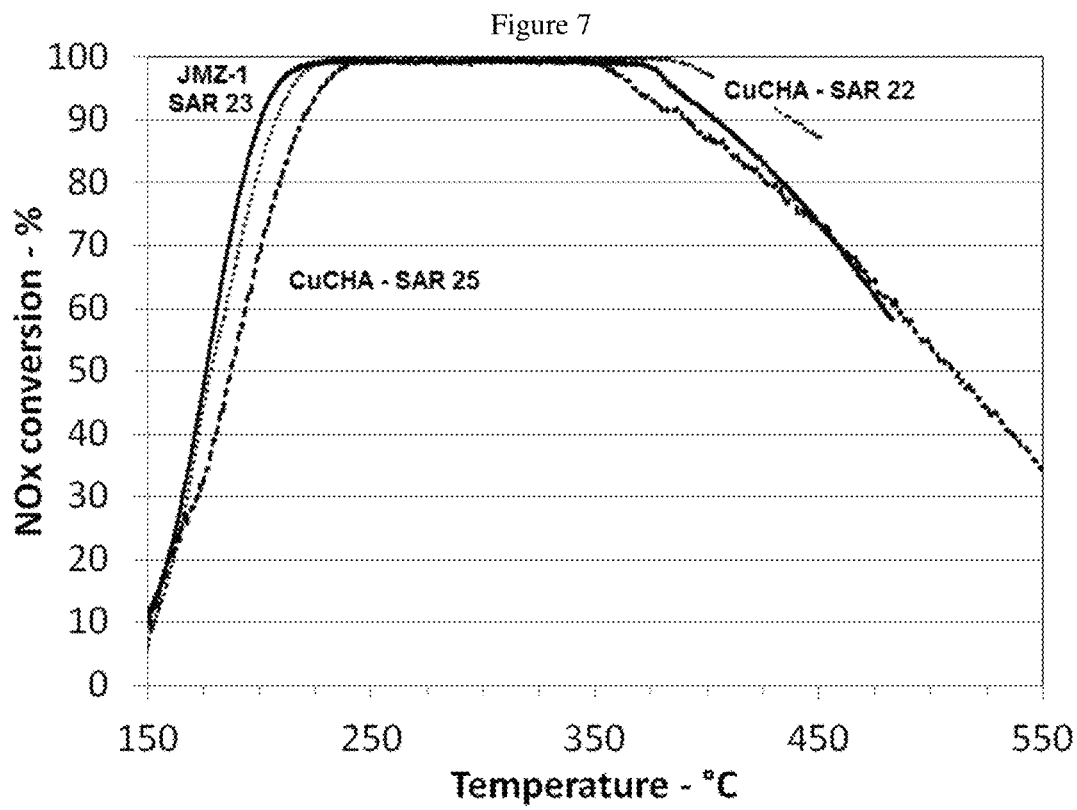
FIG. 7 is a graph of the % NOx conversion using 3% Cu-containing CHA zeolites aged hydrothermally at 900° C. for 1 hour.
Figure 8:
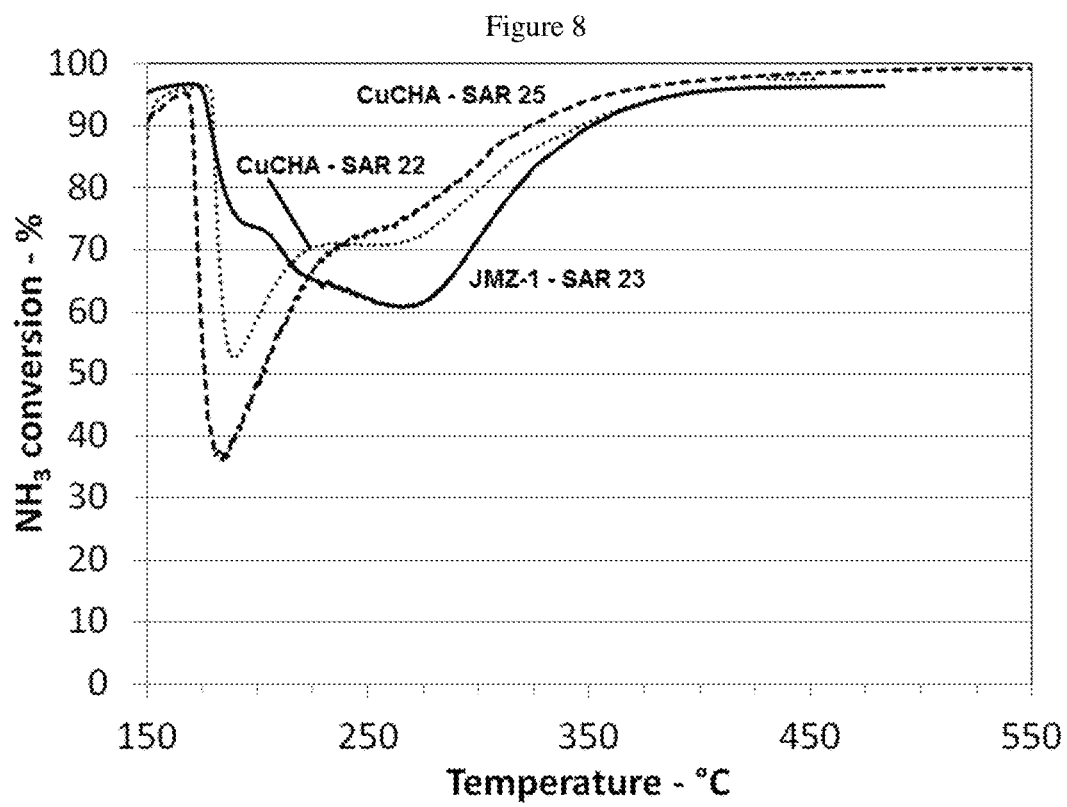
FIG. 8 is a graph of the $N_2O$ concentration in exhaust gas passing over 3% Cu-containing CHA zeolites aged hydrothermally at 900° C. for 1 hour.
Figure 9:
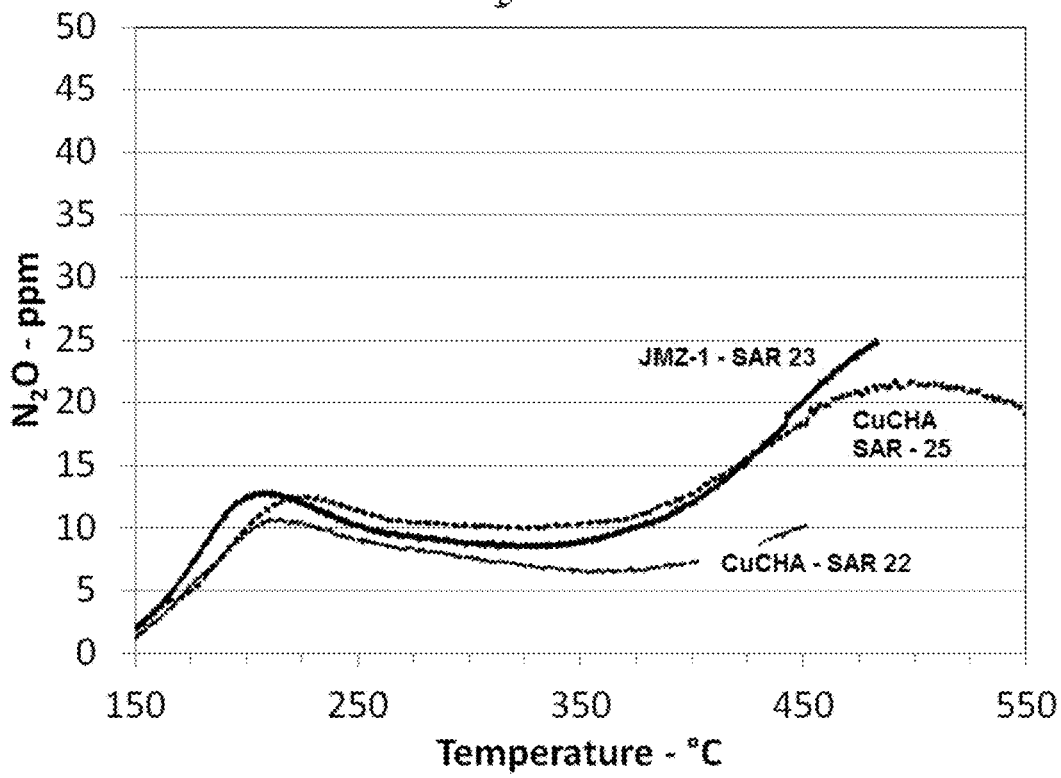
FIG. 9 is a graph of the % NH₃ conversion using 3% Cu-containing CHA zeolites aged hydrothermally at 900° C. for 1 hour.
Figure 10:
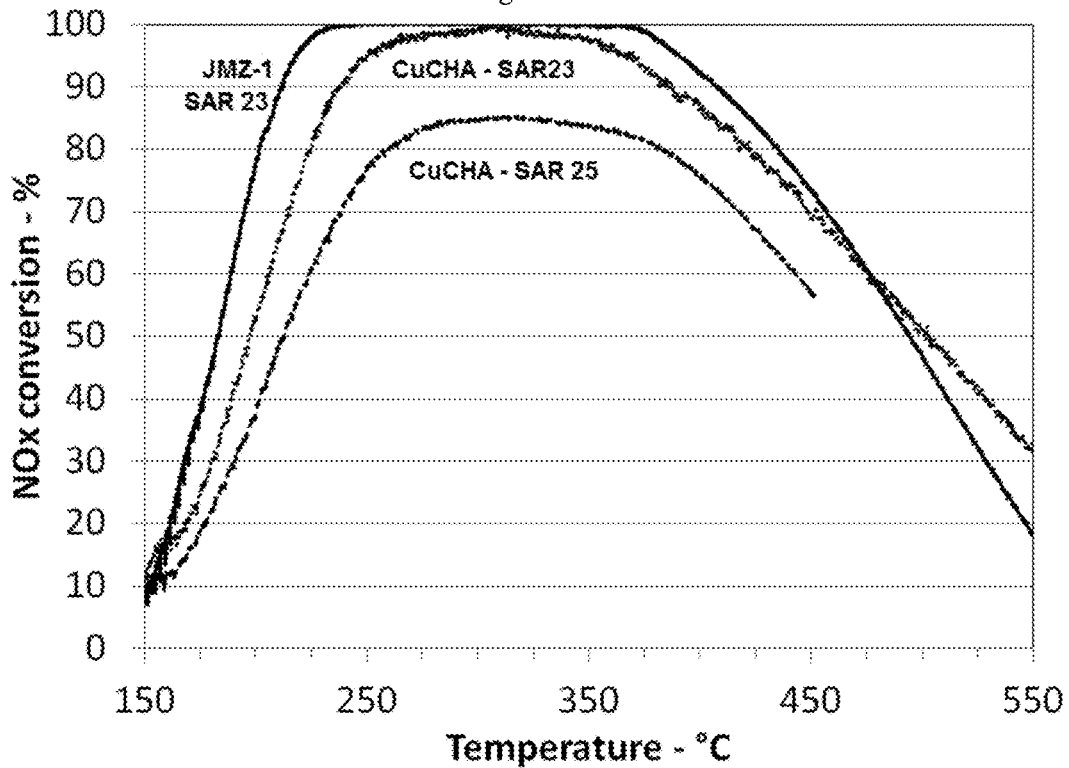
FIG. 10 is a graph of the % NOx conversion using 3% Cu-containing CHA zeolites aged hydrothermally at 900° C. for 3 hours.
Figure 11:
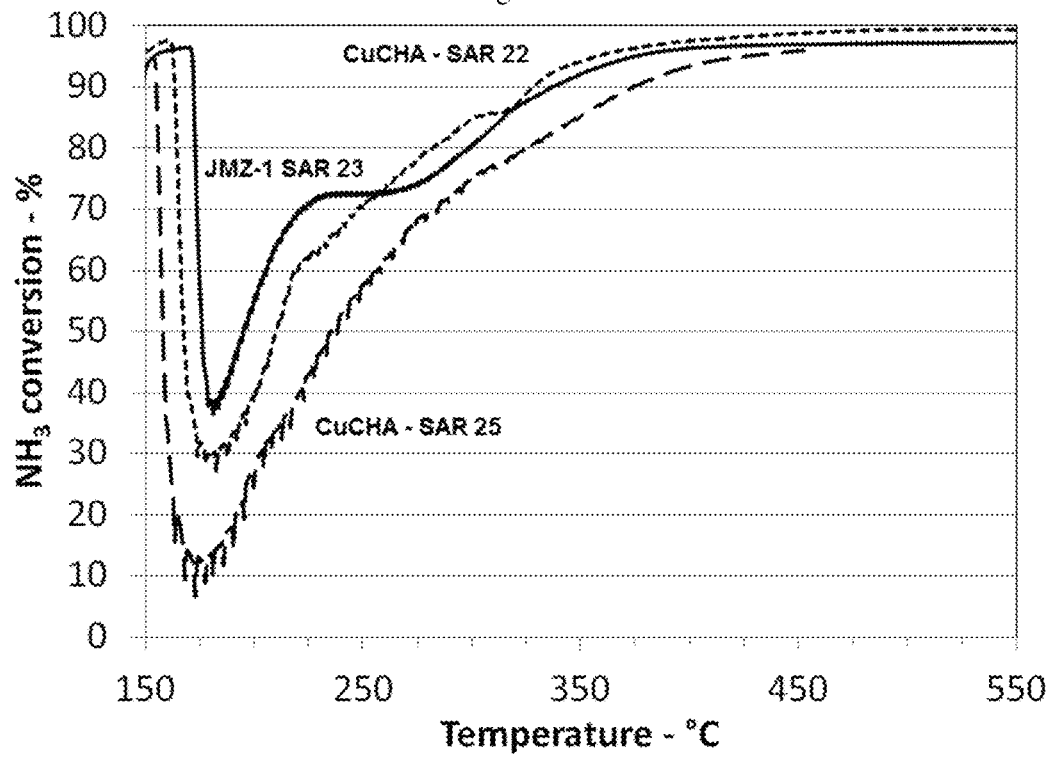
FIG. 11 is a graph of the N₂O concentration in exhaust gas passing over 3% Cu-containing CHA zeolites aged hydrothermally at 900° C. for 3 hours.
Figure 12:
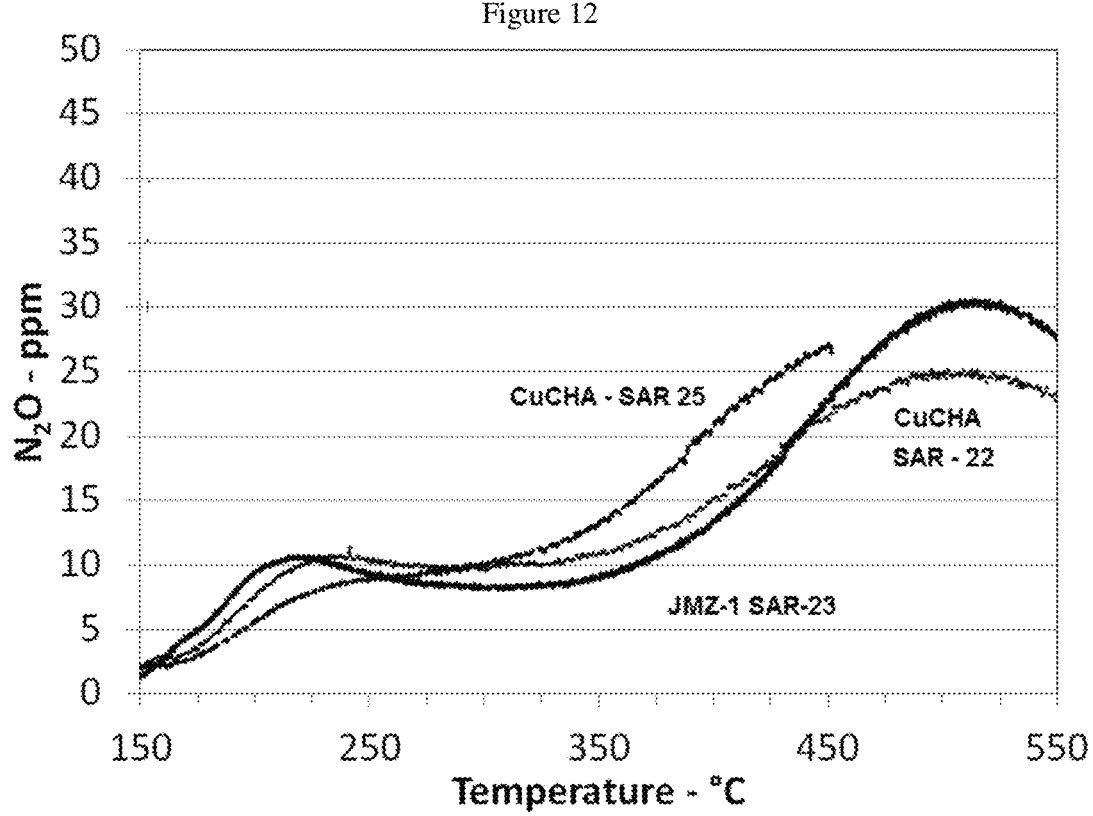
FIG. 12 is a graph of the % NH₃ conversion using 3% Cu-containing CHA zeolites aged hydrothermally at 900° C. for 3 hours.

Fresh and aged NOx conversion activity profiles over temperatures from about 150° C. to about 550° C. are given in FIGS. 4-12, with the profiles from fresh samples shown in FIGS. 4-6, profiles from samples aged hydrothermally at 900° C. for 1 hour shown in FIGS. 7-9, and profiles from samples aged hydrothermally at 900° C. for 3 hours shown in FIGS. 10-12. While the activity of fresh and one hour aged JMZ-1C catalysts was similar to that of either of the two CHA zeolites with SARs of 22 and 25, the activity of 3 hour aged catalysts was different, with the JMZ-1C catalysts generally providing higher NOx conversions. FIG. 10 shows that $NO_x$ conversion by the JMZ-1C catalysts was at least 10% greater from about 175° C. to about 225° C. compared to the CHA catalyst having an SAR of 22 and about 20% greater from about 175° C. to about 225° C. compared to the CHA catalyst having an SAR of 25.

The concentration of $N_2O$ in gas passing through fresh and aged catalysts over temperatures from about 150° C. to about 550° C. is given in FIGS. 6, 9 and 22 (fresh, aged 1 hour and aged 3 hours, respectively). Gas flowing into the apparatus contained 500 ppm NOx as NO-only. The levels of $N_2O$ in gas after passing through JMZ-1C catalysts were comparable to those from the two CHA zeolites with SARs of 22 and 25.

The $NH_3$ conversion activity profiles of catalysts aged for 3 h aged hydrothermally at 900° C. ours over temperatures from about 150° C. to about 550° C. are shown in FIG. 11. At temperatures from about 165° C. to about 225° C., JMZ-1C catalysts provided increase $NH_3$ conversion compared to the two CHA zeolites with SARs of 22 and 25. For example, at a temperature of about 175° C., the maximum % $NH_3$ conversion from either of the two CHA zeolites with SARs of 22 and 25 was about 30%, while the JMZ-1C catalysts provided about 38 and 64% conversion, which represent an increase of about 27% and 113% over the highest $NH_3$ conversion from either of the two CHA zeolites with SARs of 22 and 25.

What is claimed is:

1. A zeolite comprising CHA type framework, wherein the zeolite is an aluminosilicate having a silica-to-alumina ratio (SAR) of about 10 to about 50, wherein the zeolite has a characteristic X-ray powder diffraction pattern before calcination removal of a templating agent containing at least following diffraction peaks (in degrees 2θ (±0.2) having relative intensities shown in parenthesis) at: 9.55 (VS), 16.27 (VS), 20.99 (VS), 24.65 (M) and 31.22 (M), and wherein the zeolite has a characteristic X-ray diffraction data after calcination removal of the templating agent containing at least following peaks (in degrees 2θ having relative intensities shown in parenthesis) at: 9.59 (VS), 13.03 (M), 16.21 (W), 17.99 (W), 20.83 (M-S), 23.31 (W), 25.24 (W), 26.22 (W), 30.98 (M-W) and 31.43 (W)±0.2, where the relative intensity is based on a strongest line in the X-ray pattern which is assigned a value of 100 and (W) [weak] is less than 20; (M) [medium] is between 20 and 40; (S) [strong] is between 40 and 60; and (VS) [very strong] is greater than 60]; and wherein the templating agent comprises trimethyl(cyclohexylmethyl) ammonium cations.

2. A composition comprising a zeolite having a CHA type framework and a structure directing agent (SDA), wherein the SDA is within the framework structure, wherein the zeolite is an aluminosilicate having a silica-to-alumina ratio (SAR) of about 10 to about 50, and having a characteristic X-ray powder diffraction pattern comprising 2-theta positions at 9.55 (VS), 16.27 (VS), 20.99 (VS), 24.65 (M) and 31.22 (M)±0.2 with a corresponding relative intensity shown in parenthesis, where the relative intensity is based on a strongest line in the X-ray pattern which is assigned a value of 100 and (W) [weak] is less than 20; (M) [medium] is between 20 and 40; (S) [strong] is between 40 and 60; and (VS) [very strong] is greater than 60]; and wherein the structure-directing agent comprises trimethyl(cyclohexylmethyl) ammonium cations.

3. The composition of claim 2, wherein the characteristic X-ray powder diffraction pattern further comprises 2-theta positions at 13.15 (W), 13.91 (W), 17.50 (W), 19.18 (W), 21.95 (W), 22.87 (W), 23.34 (W), 28.05 (W) and 30.40 (W)±0.2 with the corresponding relative intensity shown in parenthesis.

* * * * *